United States Patent
Pflum (10) Patent No.: US 9,689,724 B2
(45) Date of Patent: Jun. 27, 2017

(54) RESONANT SIGNAL SENSING CIRCUIT HAVING A LOW POWER MODE

(71) Applicant: Silicon Laboratories Inc., Austin, TX (US)

(72) Inventor: Marty Pflum, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 413 days.

(21) Appl. No.: 14/135,548

(22) Filed: Dec. 19, 2013

(65) Prior Publication Data

US 2014/0176115 A1    Jun. 26, 2014

Related U.S. Application Data

(63) Continuation-in-part of application No. 13/342,506, filed on Jan. 3, 2012, now Pat. No. 9,038,480.

(51) Int. Cl.

| | |
|---|---|
| *G01R 19/00* | (2006.01) |
| *G01F 1/115* | (2006.01) |
| *G01F 1/075* | (2006.01) |
| *G01D 4/02* | (2006.01) |

(52) U.S. Cl.
CPC .............. *G01F 1/115* (2013.01); *G01F 1/075* (2013.01); *G01D 4/02* (2013.01)

(58) Field of Classification Search
CPC ......... G01R 19/00; G01F 1/075; G01F 1/115; G01D 4/02
USPC ............................................. 324/76.11, 142
See application file for complete search history.

(56) References Cited

U.S. PATENT DOCUMENTS

| | | | |
|---|---|---|---|
| 4,045,728 A | 8/1977 | Fletcher et al. | |
| 5,557,191 A * | 9/1996 | Capurka | G01D 4/02 320/135 |
| 5,987,613 A * | 11/1999 | Busch | G06F 1/1616 713/300 |
| 6,549,120 B1 | 4/2003 | de Buda | |
| 7,723,979 B2 | 5/2010 | Ashburn | |
| 2003/0056124 A1* | 3/2003 | Amick | G01R 19/252 713/300 |
| 2008/0218154 A1* | 9/2008 | Ashburn | G01D 3/08 324/119 |
| 2009/0189778 A1 | 7/2009 | Juan et al. | |
| 2009/0302870 A1* | 12/2009 | Paterson | G01N 27/223 324/670 |
| 2010/0302061 A1 | 12/2010 | Winter et al. | |

(Continued)

*Primary Examiner* — Tung X Nguyen
*Assistant Examiner* — Robert P Alejnikov, Jr.
(74) *Attorney, Agent, or Firm* — Cesari & Reed, LLP; R Michael Reed (57) ABSTRACT

An apparatus includes a sensor circuit to receive a varying signal at an input of the apparatus. The sensor circuit provides a sensor signal corresponding to a measurement of the varying signal. The apparatus further includes a timer circuit to generate a signal at various intervals of a plurality of intervals and a controller coupled to the sensor circuit. The controller has a first power mode and a second power mode, where the first power mode has a lower power consumption than the second power mode. The controller enters the second power mode in response to the signal from the timer circuit. The controller enables the sensor circuit, captures a plurality of measurements of the varying signal, and returns to the first power mode.

18 Claims, 4 Drawing Sheets

(56) References Cited

U.S. PATENT DOCUMENTS

| | | | | |
|---|---|---|---|---|
| 2010/0327839 A1* | 12/2010 | Kim | ................. | G11C 5/147 |
| | | | | 323/311 |
| 2013/0167652 A1* | 7/2013 | Pflum | ................ | G01F 1/075 |
| | | | | 73/861 |
| 2015/0180479 A1* | 6/2015 | Pflum | ................ | H03K 21/10 |
| | | | | 377/19 |

* cited by examiner

RESONANT SIGNAL SENSING CIRCUIT HAVING A LOW POWER MODE

CROSS-REFERENCE TO RELATED APPLICATION(S)

This application is a continuation-in-part of and claims priority to co-pending U.S. patent application Ser. No. 13/342,506 filed on Jan. 3, 2012 and entitled "Integrated Circuit and Apparatus for Detecting Oscillations," which is incorporated herein by reference in its entirety for all purposes.

FIELD

The present disclosure is generally related to a metering circuit configured to measure a metered resource such as the flow of fluid or gas or to measure energy usage.

BACKGROUND

An electromechanical meter includes a spinning disk that rotates at a rate that is proportional to the flow of gas, water, or electricity through the metering device. In an example, a transducer generates a rotational force in response to the flow rate, and a circuit may be configured to determine the gas, water, or electricity usage based on the rotation of the spinning disk.

SUMMARY

In an embodiment, an apparatus includes a sensor circuit to receive a varying signal at an input of the apparatus. The sensor circuit provides a sensor signal corresponding to a measurement of the varying signal. The apparatus further includes a timer circuit to generate a signal at various intervals of a plurality of intervals and a controller coupled to the sensor circuit. The controller has a first power mode and a second power mode, where the first power mode has a lower power consumption than the second power mode. The controller enters the second power mode in response to the signal from the timer circuit. The controller enables the sensor circuit, captures a plurality of measurements of the varying signal, and returns to the first power mode.

In another embodiment, a metering circuit includes a sensor circuit coupled to the input to receive a resonant signal corresponding to usage of a resource and a timer circuit to generate a timer signal at selected intervals. The metering circuit further includes a controller coupled to the timer circuit and the sensor circuit. The controller has a first power mode and a second power mode, where the first power mode has a lower power consumption than the second power mode. The controller enters the second power mode and enables the sensor circuit to capture measurements of the resonant signal in response to receiving the timer signal.

In still another embodiment, a method of measuring a resonant signal includes selectively providing an excitation signal to an output of a metering circuit at a first point in time and receiving a resonant signal at an input of the metering circuit in response to the excitation signal. The method further includes providing a wake up signal to a sensing circuit of the metering circuit at a second point in time to transition the sensing circuit from a first power mode to a second power mode for a pre-determined number of clock cycles to count a number of oscillations of the resonant signal. The first power mode has a lower power consumption than the second power mode.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a metering system and associated circuitry are described below. In an embodiment, the metering system includes a configurable sensing circuit adapted to measure a signal, such as a resonant signal from an inductor/capacitor (LC) tank circuit, a capacitive sense circuit, a Wheatstone bridge circuit, or other circuitry adapted to produce a measurable signal in response to a parameter to be measured. The metering system may further include a low-power, real-time clock (RTC) and an interval timer configured to operate as a sleep timer to provide a timing signal to control logic circuitry, which may wake up the sensor circuitry from a low power mode to a second power mode to measure a signal at an input. After a predetermined number of RTC clock pulses, the configurable sensing circuit may return to the low power mode. In an embodiment, in response to detecting a wakeup event, such as a peak count exceeding a count threshold or a change in peak measurements indicating a change in direction of an external element (such as a metering wheel), the control logic circuitry may send a second signal to a microcontroller unit (MCU), causing the MCU to wake from a sleep mode or low power mode.

In an example, the sensing circuitry and the MCU can remain in sleep mode (or low power mode) for extended periods of time, during which the RTC and interval timer continue to operate. Periodically, the RTC and interval time cause control logic to wake the sensing circuitry. The sensing circuitry may operate in a second operating mode for a predetermined number of RTC clock cycles to measure a signal at the input before returning to a low power mode. After the predetermined number of RTC clock cycles, the sensing circuit may return to the low power mode. One possible example of a metering system that includes a low power mode is described below with respect to FIG. 1

Figure 1:
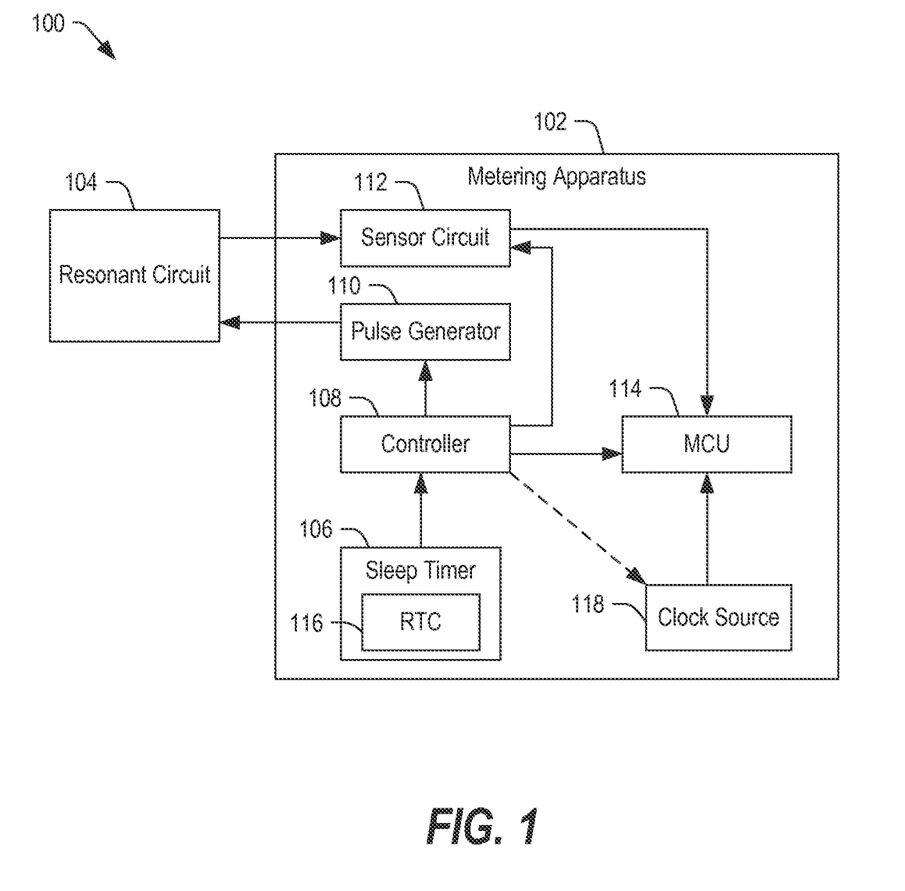
FIG. 1 is a block diagram of a metering system having a low power mode according to an embodiment.

FIG. 1 is a block diagram of a metering system 100 having a low power mode according to an embodiment. In the illustrated example, metering system 100 includes a metering apparatus 102 coupled to a resonant circuit 104. In another embodiment, resonant circuit 104 may be replaced with a capacitive sense circuit, a Wheatstone bridge circuit, or other circuitry adapted to produce a measurable signal in response to a parameter to be measured. In an embodiment, resonant circuit 104 may be an inductor-capacitor (LC) tank circuit configured to produce a resonant signal that varies based on a rotational position of a wheel. In an example, the resonant signal may have a first signal characteristic when a non-metalized portion of the wheel is proximate to the LC tank circuit and may have a second (damped) signal characteristic when a metalized portion of the wheel is proximate to the LC tank circuit.

Metering apparatus 102 may include a sleep timer 106 coupled to a controller 108. Sleep timer 106 may include an RTC 116 and may include an interval timer (such as interval timing circuit 244 in FIG. 2). The controller 108 may be coupled to a pulse generator 110 and a sensor circuit 112. The sensor circuit 112 may be coupled to one or more counter registers (such as counter registers 228 and 230 in FIG. 2) and to an MCU 114. The controller 108 may be coupled to the MCU 114 and to a clock source 118, which may also be coupled to the MCU 114.

In an embodiment, sleep timer 106 periodically generates a timing signal based on RTC clock pulses from RTC 116 and provides the timing signal to controller 108. In response to the timing signal, controller 108 may cause pulse generator 110 to provide a pulse to resonant circuit 104, causing resonant circuit 104 to produce an oscillating signal. Controller 108 may also send a signal to sensor circuit 112 to pre-charge sensor circuit 112 to sense peaks within the resonant signal from resonant circuit 104. In an embodiment, controller 108 may cause pulse generator 110 to provide the pulse to resonant circuit 104 at a first time and may send the signal to sensor circuit 112 to measure the resonant signal at a second time.

Sensor circuit 112 may operate in a low power mode and may enter a second (higher) power mode in response to receiving the signal from controller 108. Sensor circuit 112 may return to the low power mode after a pre-determined number of RTC clock cycles. MCU 114 may remain a sleep mode (or low power mode) during the measurement process. In an embodiment, controller 108 may selectively activate MCU 114 and/or control clock source 118 to activate MCU 114 in response to a wakeup event. In an example, the wakeup event may include at least one of a peak count exceeding a count threshold and a change in the peak counts indicating a change in direction, such as a change in the direction of a rotating wheel, which can be determined using quadrature encoding.

In an embodiment, to conserve power, the MCU 114 can be kept in sleep mode for long periods of time during which the RTC 116 and the sensing circuit 112 may operate. Moreover, the sensing circuit 112 may be in a low power mode until the controller 108 provides the signal to the sensing circuit 112, at which time the sensing circuit 112 may enter a second power mode. In the second power mode, the sensing circuit 112 may measure one or more parameters of a signal from resonant circuit 104.

While the illustrated example of FIG. 1 depicts a single resonant circuit 104, other types of circuits may be used, including a capacitive sense circuit, a Wheatstone bridge circuit, or other circuitry adapted to produce a measurable signal in response to a parameter to be measured. Additionally, in some embodiments, a second resonant circuit 104 may be coupled to a second sensing circuit 112 within metering apparatus 102. In an embodiment of the metering apparatus 102 that is configured to monitor rotation of a wheel, sensing circuits (such as first and second resonant tanks) may be positioned adjacent to the wheel and spaced apart from one another to provide dual measurement signals, which can be processed to determine the rate of rotation as well as the direction. One possible example of a metering system including a metering circuit that can receive two different resonant signals is described below with respect to FIG. 2.

Figure 2:
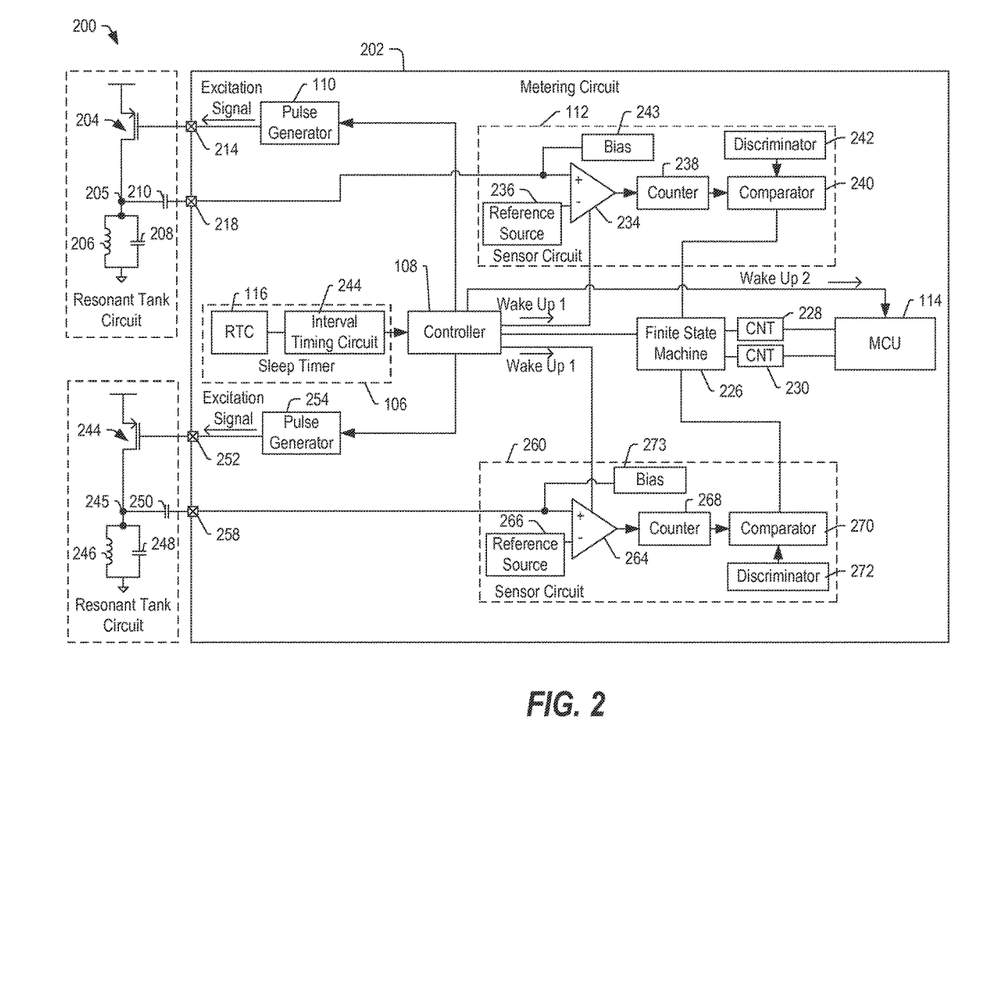
FIG. 2 is a diagram of a metering system having a low power mode according to a second embodiment.

FIG. 2 is a diagram of a metering system 200 having a low power mode according to a second embodiment. Metering system 200 includes a metering circuit 202, which is configured to receive a signal from two external circuits, which in this embodiment included resonant tank circuits. In the illustrated example, metering circuit 200 includes all of the elements of metering apparatus 102 of FIG. 1, including pulse generator 110, sensor circuit 112, controller 108, sleep timer 106, RTC 116, MCU 114, and optionally clock source 118 (not shown). Additionally, metering circuit 202 includes additional circuitry to facilitate operation with two input signal sources, such as resonant tank circuits.

Metering circuit 202 includes a sleep timer 106 coupled to controller 108. Sleep timer 106 includes RTC 116 and an interval timing circuit 244, which is coupled between RTC 116 and controller 108. Sleep timer 106 may be configured to periodically send a signal to controller 108.

Metering circuit 202 includes pulse generator 110 coupled between controller 108 and an output 214, which may be implemented as a pad, pin or contact location configurable to interconnect with an external circuit. Metering circuit 202 further includes an input 218, which may be implemented as a pad, pin, or contact location configurable to interconnect with an external circuit. Input 218 is coupled to sensor circuit 112.

Sensor circuit 112 includes a comparator 234 having a first input coupled to input 218 and to a bias source 243, a second input coupled to a reference source 236, and an output coupled to a counter 238. In an example, the bias source 243 may include a voltage configured to level shift the input signal. Counter 238 includes an output coupled to a comparator 240, which includes a second input coupled to a discriminator 242 and includes an output.

Metering circuit 202 further includes a pulse generator 254 coupled between controller 108 and an output 252, which may be implemented as a pad, pin or contact location configurable to interconnect with an external circuit. Metering circuit 202 further includes an input 258, which may be implemented as a pad, pin, or contact location configurable to interconnect with an external circuit. Input 258 is coupled to sensor circuit 260.

Sensor circuit 260 includes a comparator 264 having a first input coupled to input 258 and to a bias source 273, a second input coupled to a reference source 266, and an output coupled to a counter 268. In an example, the bias source 273 may include a voltage configured to level shift the input signal. Further, reference source 266 may be the same as reference source 236, depending on the implementation. Counter 238 includes an output coupled to a comparator 270, which includes a second input coupled to a discriminator 272 and includes an output.

Metering circuit 202 includes a finite state machine (FSM) 226 having a first input coupled to controller 108, a second input coupled to the output of comparator 240, and a third input coupled to the output of comparator 270. FSM 226 includes a first output coupled to a count register (CNT) 228 and a second output coupled to a count register (CNT) 230. Metering circuit 202 further includes a microcontroller unit (MCU) 114 coupled to CNT 228 and CNT 230. MCU 114 may include a plurality of connections (not shown) to communicate with other circuitry of metering circuit 202 (such as transceivers, memory, and other circuits).

The external resonant tank circuits may be configured to generate a resonant signal that has damping characteristics that vary based on a parameter to be sensed. In the illustrated example, a first resonant tank circuit includes a transistor 204 coupled between a power supply and a node 205, and including a gate coupled to output 214 of metering circuit 202. The first resonant tank circuit further includes an inductor 206 and a capacitor 208 coupled in parallel between node 205 and a second power supply, such as ground. Additionally, the first resonant tank circuit is AC coupled to input 218 through capacitor 210, which is coupled between node 205 and input 218.

A second resonant tank circuit includes a transistor 244 coupled between a power supply and a node 245, and including a gate coupled to output 252 of metering circuit 202. The second resonant tank circuit further includes an inductor 246 and a capacitor 248 coupled in parallel between node 245 and a second power supply, such as ground. Additionally, the second resonant tank circuit is AC coupled to input 258 through capacitor 250, which is coupled between node 245 and input 258.

In an embodiment, the metering circuit 202 may operate in a low-power mode such that all or most of the circuit elements may be in an idle or sleep state, except for the sleep timer 106, which uses a low-power RTC 116 and an interval timer 244. In this mode, sleep timer 106 periodically wakes the controller 108, which causes other circuits to wake up, as desired or appropriate, to measure an input signal and then those other circuits may return to a sleep, idle, or low power state until a next wake up signal is received.

In an embodiment, sleep timer 106 counts RTC clock cycles from RTC 116 using interval timing circuit 244, which sends a signal to controller 108 when the number of RTC clock cycles exceeds a pre-determined number. In response to the signal from sleep timer 106, controller 108 sends a signal to pulse generator 110, causing pulse generator 110 to apply an excitation signal or pulse to output 214. The excitation signal biases transistor 204 to briefly couple the power supply to node 205, charging capacitor 208. When the excitation signal is stopped (i.e., the pulse ends), transistor 204 decouples the power supply from node 205. Charge stored by capacitor 208 is discharged into inductor 206, building up a magnetic field around the inductor 206 and reducing the voltage stored by the capacitor 208. When the capacitor 208 is discharged, the inductor 206 will have the charge stored in its magnetic field and since the inductor 206 resists changes in current flow, the energy to keep the current flowing is extracted from the magnetic field, which begins to decline, and the current flow will charge the capacitor with a voltage of opposite polarity to its original charge. When the magnetic field of inductor 206 is dissipated, the current stops and the opposite polarity charge is stored in capacitor 208. The discharge/recharge process is repeated with the current flowing in the opposite direction through the inductor 206. The energy oscillates back and forth between the capacitor 208 and the inductor 206 until (if not replenished by power from an external circuit, such as the power supply through transistor 204) internal resistance makes the oscillations die out. When used in conjunction with a metering wheel that has a metalized portion, the oscillations die out faster (damped) when the metalized portion is proximate to the resonant tank circuit and die out slower (undamped) when the non-metalized portion is proximate to the resonant tank circuit.

After or at the same time as the controller 108 provides the signal to the pulse generator 110, the controller 108 provides a wake up signal to sensor circuit 112 to power up or pre-condition its circuitry with sufficient time to measure the resonant signal from input 218. Sensor circuit 112 applies the bias 243 to first input and activates reference source 236 to pre-condition the comparator 234, for example. Comparator 234 receives the oscillating signal from input 218 and compares the level of the oscillating signal to a reference signal from reference source 236, producing an output that is a logic high level when the oscillating signal exceeds the reference signal and a logic low level when the oscillating signal falls below the reference signal. Counter 238 counts the logic high signals and provides them to a comparator 240, which compares the count to a value from discriminator 242. The output of the comparator 240 indicates the presence or absence of a damping element (such as a metalized portion of the wheel proximate to the resonant tank). Controller 108 may wake up FSM 226 to receive the output of comparator 240, which output is used by the FSM 226 to update the CNT register 228. Pulse generator 254 and sensor circuit 260 may operate in the same way, causing FSM 226 to update CNT register 230.

In an embodiment, controller 108 may trigger operation of pulse generator 110 at a first time, and wake sensor circuit 112 at a second time. Controller 108 may trigger operation of pulse generator 254 at a third time, and wake sensor circuit 260 at a fourth time.

In an alternative embodiment, controller 108 may trigger operation of pulse generator 110 and wake up sensor circuit 112 at a first time and may trigger operation of pulse generator 254 and wake up sensor circuit 260 at a second time. In another embodiment, controller 108 may provide a wake up signal to sensor circuit 112 at a first time, excite the first resonant tank at a second time, provide a wake up signal to sensor circuit 260 at a third time, and excite the second resonant tank at a fourth time. Other interleaved timing configurations may also be used. In an embodiment, the controller may trigger operation of both pulse generators 110 and 254 at a first time and may measure the resulting signal using sensor circuits 112 and 260 at a second time. One possible example of signal timing is described below with respect to FIG. 3.

Figure 3:
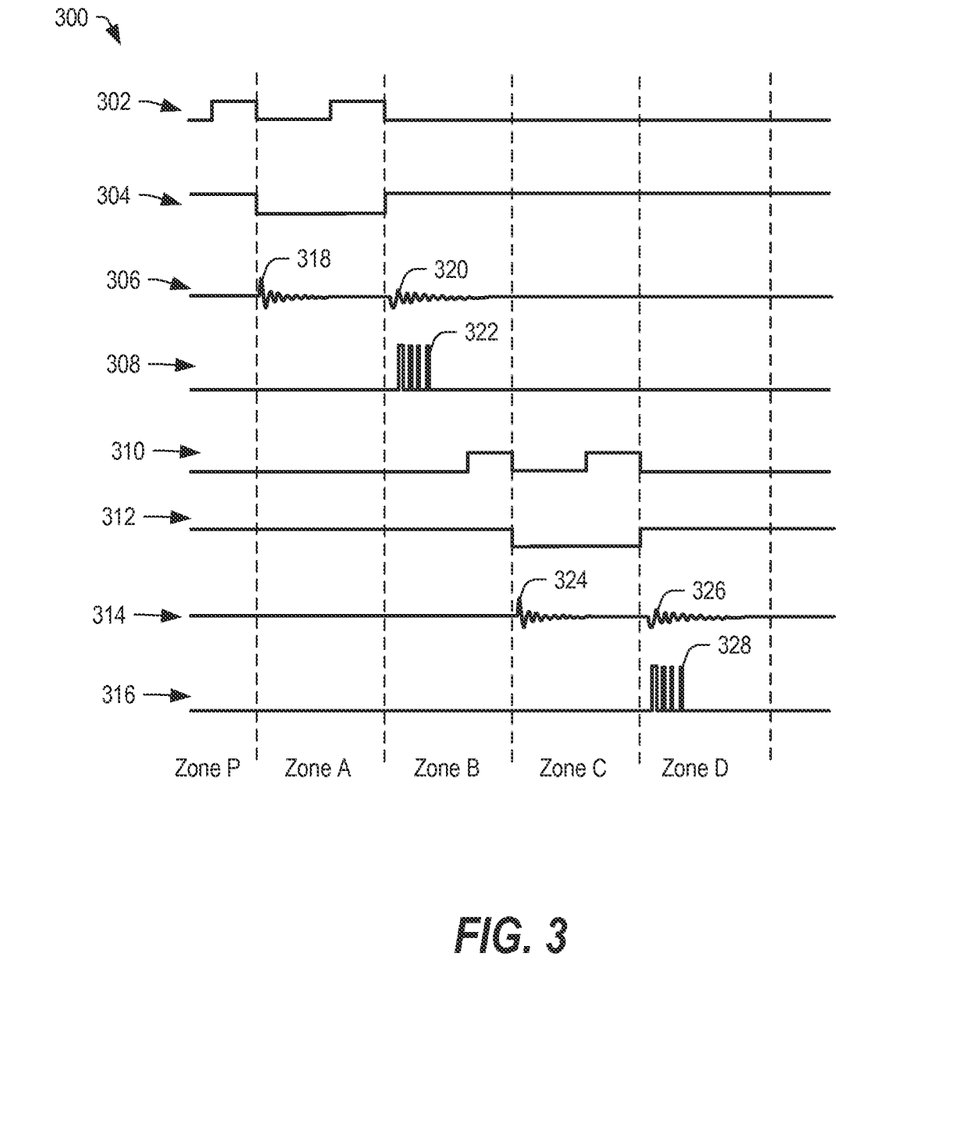
FIG. 3 is a timing diagram of signals within and received by the metering system of FIG. 2 according to an embodiment.

FIG. 3 is a timing diagram 300 of signals within and received by the metering system of FIG. 2 according to an embodiment. Timing diagram 300 depicts five zones or phases, including a pre-condition zone P and zones A, B, C, and D, which correspond to time segments within a sensing operation, which time segments may be associated with clock cycles of RTC 116. In an example, each zone may correspond to a plurality of cycles of the RTC 116, and the number of cycles may be programmable, depending on the implementation, allowing for a variety of external sensing circuit configurations.

In an embodiment, controller 108 causes pulse generator 110 and pulse generator 254 to provide excitation signals to outputs 214 and 252, respectively, at different times within the sensing operation to pre-condition (energize) the associated resonant tank circuit. The controller 108 may provide control signals to cause pulse generators 110 and 254 to excite the respective resonant circuit in one zone and may provide control signals to cause sensor circuits 112 and 260 to count oscillations in another zone. The timing of the zones, the polarity, and the compare regions may be programmable. In this example, the zones have been programmed to different multiples of cycles of the RTC 116.

Timing diagram 300 includes wake up signal 302 from controller 108 to sensor circuit 112 and wake up signal 310 from controller 108 to sensor circuit 260. Further, timing diagram 300 includes excitation signal 304 provided by pulse generator 110 to output 214 and includes excitation signal 312 provided by pulse generator 254 to output 252. Timing diagram 300 also includes ringing signal or oscillating signal 306 at input 218 and includes ringing signal or oscillating signal 314 at input 258. Finally, timing diagram 300 includes a comparator output signal 308 at an output of comparator 234 and includes a comparator output signal 316 at an output of comparator 264. In an embodiment, the excitation signals 304 and 312 may be configured to have a shorter programmable time of less than one RTC clock cycle or may be programmed to have a selected duration that may be some multiple of an RTC clock cycle.

In an example, during a pre-condition zone (Zone P), controller 108 provides a wake up signal 302 to sensor circuit 112, which wake up signal can be used to set the bias 243 at the first input of comparator 234 to a voltage level that is approximately half of the input voltage swing, level shifting the input voltage signal. The bias applied to the first input of comparator 234 also operates to pre-condition capacitor 210 of the first resonant circuit. The wake up signal 302 is turned off at the end of Zone P.

During Zone A of the sensing process, controller 108 causes pulse generator 110 to provide excitation signal 304 to output 214. Since transistor 204 in FIG. 2 is depicted as a p-channel metal oxide semiconductor field effect transistor (PMOSFET), a positive voltage applied to output 214 maintains transistor 204 in an off-state, while a low voltage applied to output 214 may bias transistor 204 to couple the power supply to node 205. In this example, during Zone P, excitation signal 304 is in a logic high state, and at the beginning of Zone A, excitation signal 304 transitions to a logic low state, providing current to node 205, charging capacitor 208, which causes the first resonant circuit to produce an oscillating signal 306, which rings as indicated at 318. After a period of time (less than the entirety of Zone A), the ringing largely subsides indicating that the charging operation has reached a steady state. Before the end of Zone A, the controller 108 sends a second wake up signal pulse to sensor circuit 112 to set the bias 243 and to reset the state of capacitor 210 of the first resonant circuit, which second wake up signal pulse terminates at the end of Zone A. In an embodiment, a shorter width pulse may be used, such as a pulse width that is less than 1 RTC cycle wide.

At the end of Zone A and beginning of Zone B, the controller causes pulse generator 110 to remove the excitation signal 304 at output 214, transitioning the signal from a logic low to a logic high level, turning off transistor 204. During Zone B, capacitor 208 discharges through inductor 206, producing oscillations 320, which are compared to a reference signal by comparator 234 to produce the comparator output signal 308 having pulses 322 that may be counted by counter 238. Once the peak of the oscillations 320 falls below the reference signal level, the comparator 234 no longer produces output pulses. Before the end of Zone B, controller 108 wakes sensor circuit 260 by sending a wake up signal 310 to precondition sensor circuit 260. In particular, the wake up signal 310 can be used to set the bias 273 at the first input of comparator 264 to a voltage level that is approximately half of the input voltage swing, level shifting the input voltage signal. The bias applied to the first input of comparator 264 also operates to pre-condition capacitor 250 of the second resonant circuit. The wake up signal 310 is turned off at the end of Zone B.

During Zone C of the sensing process, controller 108 causes pulse generator 254 to provide excitation signal 312 to output 252. Since transistor 244 in FIG. 2 is depicted as a PMOSFET, a positive voltage applied to output 252 maintains transistor 244 in an off-state, while a low voltage applied to output 252 may bias transistor 244 to couple the power supply to node 245. In this example, during Zones P, A, and B, excitation signal 312 is in a logic high state, and at the beginning of Zone C, excitation signal 312 transitions to a logic low state, providing current to node 245, charging capacitor 248, which causes the first resonant circuit to produce an oscillating signal 314, which rings as indicated at 324. After a period of time (less than the entirety of Zone C), the ringing largely subsides indicating that the charging operation has reached a steady state. Before the end of Zone C, the controller 108 sends a second wake up signal pulse to sensor circuit 260 to set the bias 273 and to reset the state of capacitor 250 of the second resonant circuit, which second wake up signal pulse terminates at the end of Zone C.

At the end of Zone C and beginning of Zone D, the controller causes pulse generator 254 to remove the excitation signal 312 at output 252, transitioning the signal from a logic low to a logic high level, turning off transistor 244. In an embodiment, a shorter width pulse may also be used, such as a pulse width that is less than 1 RTC cycle wide. During Zone D, capacitor 248 discharges through inductor 246, producing oscillations 326, which are compared to a reference signal by comparator 264 to produce the comparator output signal 316 having pulses 328 that may be counted by counter 268. Once the peak of the oscillations 326 falls below the reference signal level, the comparator 264 no longer produces output pulses.

After Zone D, metering circuit 202 may remain in a holding pattern or idle state for a period of time, until sleep timer 106 causes the sensing process to be repeated. In the example, at the end of Zone B, comparator 240 compares a count value of counter 238 to a programmed digital threshold (discriminator 242) to discriminate between a dampened or undampened state and send a "0" or "1" to the FSM 226. At the end of Zone D, comparator 270 compares a count value of counter 268 to a programmed digital threshold (discriminator 272) to discriminate between a dampened or undampened state and send a "0" or "1" to the FSM 226. Depending on the mode (single, dual, or quadrature), the state machine 226 may increment the CNT register 228 and the CNT register 230 based on the received state values. For quadrature mode, the information from the first and second resonant circuits can be used to decide the direction of rotation of the rotating wheel and either increment CNT register 228 for clock-wise rotation or CNT register 230 for counter clock-wise rotation.

In the illustrated example, the MCU 114 may remain in a sleep mode throughout the sensing process, and the sensor circuit 112 may return to a low power state during Zones C and D. Similarly, sensor circuit 260 may be in a low power state during Zones P, A, and B, and may return to the low power state after Zone D. Thus, metering circuit 202 provides a low-power sensing capability, where controller 108 wakes sensor circuits 112 and 260 during selected zones of the sensing cycle. During other zones of the sensing cycle, sensor circuits 112 and 260 are in a low power mode.

In an embodiment, controller 108 may wake up MCU 114 in response to particular event triggers. For example, after a certain number of measurement processes or cycles have been completed, controller 108 may wake up MCU 114 to process the measurement data. In an example, MCU 114 may control a transceiver to transmit the measurement data. Since the RTC 116 is a low-power clock and MCU 114 may be clocked with a higher frequency clock, maintaining the MCU 114 in a low power state or sleep state reduces overall power consumption. Controller 108 may wake the controller, as desired or appropriate, to perform specific functions. In one possible example, the controller 108 may control the MCU 114 to wake up to run a diagnostic procedure, to generate output signals, and so on. In one embodiment, controller 108 may wake MCU 114 so that the MCU 114 can exercise precise timing control of external I/O pads. In another example, the controller 108 may wake the MCU 114 in response to a specific event trigger, such as a number of sensing processes exceeding a pre-determined threshold, a peak count exceeding a count threshold, a change in the resonant signal indicating a change in direction, another change in a parameter, or any combination thereof.

While the above-discussion has focused on a resonant signal implementation using a resonant tank circuit, such as an inductor-capacitor tank, it should be appreciated that metering circuit 202 and metering apparatus 102 may be used with other sensing circuits configured to generate a time varying signal. Further, metering circuit 202 may be configured to operate with a single sensing circuit or a dual sensing circuit. In an embodiment, MCU 114 may detect the presence of one external circuit or two external circuits and may configure the controller 108 accordingly. In such an instance, if one sensing circuit is coupled to metering circuit 202, one of the sensor circuits 112 and 260 may be enabled during the sensing process, depending on whether the sensing circuit is coupled to input 214 and output 218 or input 252 and output 258.

Figure 4:
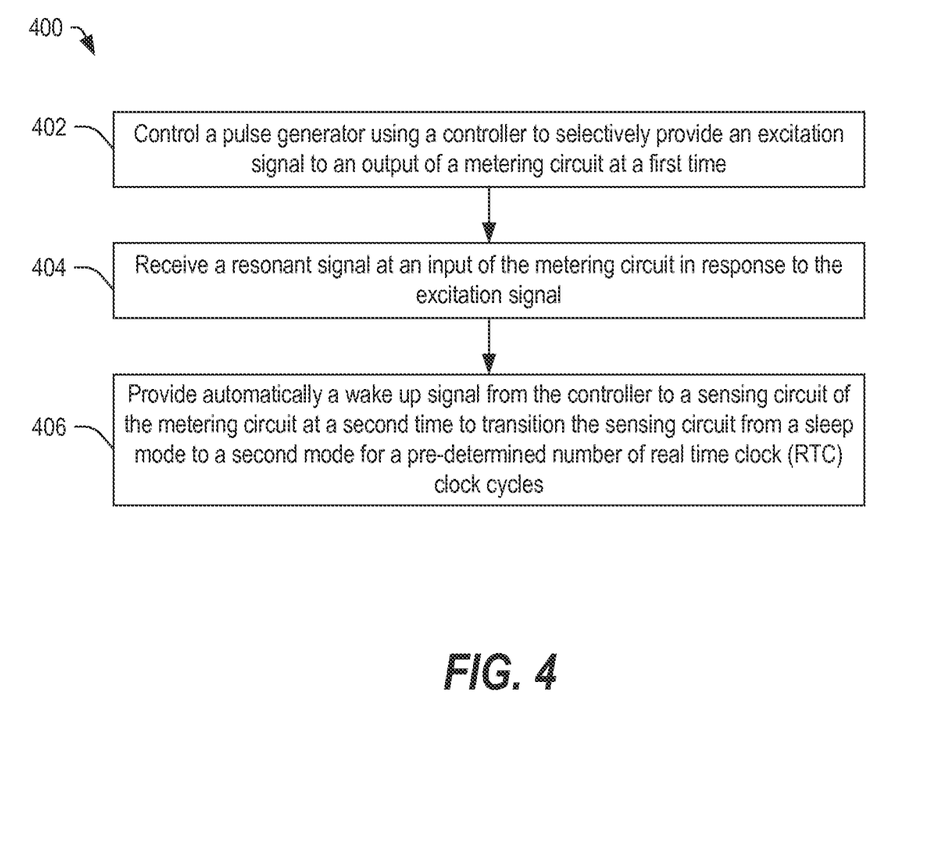
FIG. 4 is a method of waking up a sensor circuit within a metering system according to an embodiment.

FIG. 4 is a method 400 of waking up a sensor circuit within a metering system according to an embodiment. At 402, a pulse generator is controlled by a controller to selectively provide an excitation signal to an output of a metering circuit at a first time. In an embodiment, the controller triggers the pulse generator to provide the excitation signal periodically, such as during a first portion of a measurement sequence, which may span multiple RTC clock cycles. Advancing to 404, a resonant signal is received at an input of the metering circuit in response to the excitation signal.

Continuing to 406, a wake up signal is provided automatically from the controller to a sensing circuit of the metering circuit at a second time to transition the sensing circuit from a sleep mode to a second mode for a pre-determined number of real time clock (RTC) clock cycles. In an embodiment, the wake up signal causes the sensing circuit to perform a plurality of measurements of the resonant signal. In another embodiment, the wake up signal causes the sensing circuit to control at least one input/output (I/O) of the circuit.

In an embodiment, the controller receives a first clock signal from a real time clock and determines the first time from the real time clock using an interval timing circuit. In one possible aspect, the circuit may include a microcontroller unit (MCU), which may be kept in a low power, idle or sleep mode until it receives a wake up signal from the controller. In an example, the controller may detect a wake up event, which causes the controller to send a wake up signal to the MCU to enable the MCU, transitioning the MCU from a low power state to a second power state. In an example, the wake up event may include a peak count exceeding a count threshold, a change in the resonant signal indicating a change in direction, another change in a parameter, or any combination thereof. In an embodiment, the microcontroller may receive a second clock signal from a second clock source.

In accordance with various embodiments, the methods described herein may be implemented as one or more sets of instructions executing on a processor or controller. In accordance with another embodiment, the methods described herein may be implemented as programmable hardware, such as a field programmable gate array. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

Although the present invention has been described with reference to preferred embodiments, workers skilled in the art will recognize that changes may be made in form and detail without departing from the scope of the invention.

What is claimed is:

1. An apparatus comprising:
  a sensor circuit connected to an input that is coupled to a resonant circuit to receive a varying signal at an input of the apparatus, the varying signal produced by the resonant circuit in response to a parameter to be measured, the sensor circuit to provide a sensor signal corresponding to a measurement of the varying signal;
  a timer circuit to generate a signal at various intervals of a plurality of intervals; and a controller coupled to the sensor circuit and having a first power mode and a second power mode, the first power mode having a lower power consumption than the second power mode, the controller to enter the second power mode in response to the signal from the timer circuit and to:
  enable the sensor circuit;
  capture a plurality of measurements of the varying signal;
  return to the first power mode; and
  selectively provide a wakeup signal to a microcontroller unit in response to the plurality of measurements of the varying signal.

2. The apparatus of claim 1, further comprising:
  a pulse generator to provide an excitation signal to an output of the apparatus at a first point in time, the output coupled to the resonant circuit; and
  wherein the sensor circuit receives the varying signal in response to the excitation signal at a second point in time.

3. The apparatus of claim 2, wherein the controller provides a wake up signal to the sensor circuit and the pulse generator at the first point in time.

4. The apparatus of claim 2, wherein:
the timer circuit comprises a real time clock (RTC); and
the first point in time and the second point in time are separated by a pre-determined number of clock cycles of the RTC.

5. The apparatus of claim 1, further comprising the resonant circuit having a first node that is coupled to the input of the sensor circuit, the resonant circuit to produce the varying signal, the resonant circuit including an inductor-capacitor (LC) tank circuit.

6. The apparatus of claim 1, further comprising a sensing circuit coupled to the input of the sensor circuit, the sensing circuit configured to produce the varying signal, the sensing circuit comprising at least one of a capacitive sensing circuit, a magneto-resistive sensing circuit, and an optical sensing circuit.

7. The apparatus of claim 1, wherein the timer circuit generates the signal periodically.

8. The metering circuit of claim 1, wherein the time varying signal comprises a resonant signal.

9. The metering circuit of claim 1, wherein the resonant signal corresponds to usage of a resource.

10. A metering circuit comprising:
a sensor circuit connected to an input that is coupled to the input to receive the resonant signal corresponding to the usage of the resource from an external circuit;
a timer circuit to generate a timer signal at selected intervals;
a microcontroller unit configured to remain in a low power mode and to transition to a higher power mode in response to a wakeup signal; and
a controller coupled to the timer circuit and the sensor circuit, the controller having a first power mode and a second power mode, the first power mode having a lower power consumption than the second power mode, the controller configured to enter the second power mode and enable the sensor circuit to capture measurements of the resonant signal in response to receiving the timer signal, the controller configured to selectively provide the wakeup signal to the microcontroller unit based on the measurements of the resonant signal.

11. The metering circuit of claim 10, further including a pulse generator coupled to the controller, the pulse generator to provide an excitation signal provided to an output coupled to the external circuit in response to a signal from the controller.

12. The metering circuit of claim 11, wherein the controller controls the pulse generator to provide the excitation signal at a first point in time and controls the sensing circuit to wake up at a second point in time.

13. The metering circuit of claim 10, wherein the timer circuit comprises:
a real time clock (RTC) to provide a clock signal; and
an interval timing circuit coupled to the RTC to receive the clock signal and to provide the timer signal at the periodic intervals to the controller.

14. The metering circuit of claim 10, further comprising a state machine circuit coupled to the sensor circuit, the state machine circuit configured to update a first counter and a second counter in response to an output signal from the sensor circuit.

15. The metering circuit of claim 14, further comprising the microcontroller coupled to the first counter and the second counter and responsive to a wakeup signal from the controller to transition from the first power mode to the second power mode.

16. The metering circuit of claim 15, wherein the controller wakes up the microcontroller in response to a peak count exceeding a count threshold.

17. The metering circuit of claim 10, wherein, in response to the signal from the timer circuit, the controller is configured to:
enable the sensor circuit;
capture a plurality of measurements of the resonant signal; and
return to the first power mode.

18. The metering circuit of claim 10, wherein the sensor circuit is configured provide a sensor signal corresponding to a measurement of the resonant signal.

* * * * *